United States Patent [19]

Walker

[11] Patent Number: 5,715,620
[45] Date of Patent: Feb. 10, 1998

[54] MECHANIZED ANIMATED DISPLAY FOR AN AUTOMOBILE

[76] Inventor: Daniel C. Walker, 2509 Cobbs Way, Anderson, S.C. 29621

[21] Appl. No.: 458,279

[22] Filed: Jun. 2, 1995

Related U.S. Application Data

[63] Continuation-in-part of Ser. No. 115,763, Sep. 3, 1993, abandoned.

[51] Int. Cl.[6] .................................................. G09F 21/04
[52] U.S. Cl. .............................. 40/591; 40/411; 40/666; 24/326; 24/338; 15/250.21
[58] Field of Search ............................ 40/591, 658, 666, 40/414, 411; 24/326, 336, 338; 15/246, 250.001, 250.21, 250.351

[56] References Cited

U.S. PATENT DOCUMENTS

| | | | |
|---|---|---|---|
| 556,209 | 3/1896 | Quinn | 24/338 X |
| 2,387,953 | 10/1945 | Terry | 15/250.001 X |
| 2,650,355 | 8/1953 | Piecczonka | 15/250.001 X |
| 2,799,887 | 7/1957 | Nemic | 15/250.001 |
| 3,231,951 | 2/1966 | De Armond | 40/658 X |
| 3,349,453 | 10/1967 | Chiyoichi Ilda et al. | 24/489 |
| 3,398,475 | 8/1968 | Palmer | 40/658 |
| 4,464,808 | 8/1984 | Berry | 15/257.01 |
| 4,782,547 | 11/1988 | Mohnach | 15/250.04 |

*Primary Examiner*—Brian K. Green
*Attorney, Agent, or Firm*—Henry S. Jaudon; Cort Flint

[57] ABSTRACT

A mechanical animated display assembly is attached to an automobile wiper arm assembly. The display assembly includes a displayed article and a mounting bracket. The mounting bracket includes a clamp mechanism to be attached to the automobile wiper arm assembly. An article holder mechanism is integral with the mounting bracket for carrying the displayed article. A retainer retains the displayed article on the mounting bracket whereby the display assembly, in combination with oscillation of automobile wiper arm, effectuates an animated visual effect of the article being carried by and manipulated by a human arm in a waving motion.

6 Claims, 2 Drawing Sheets

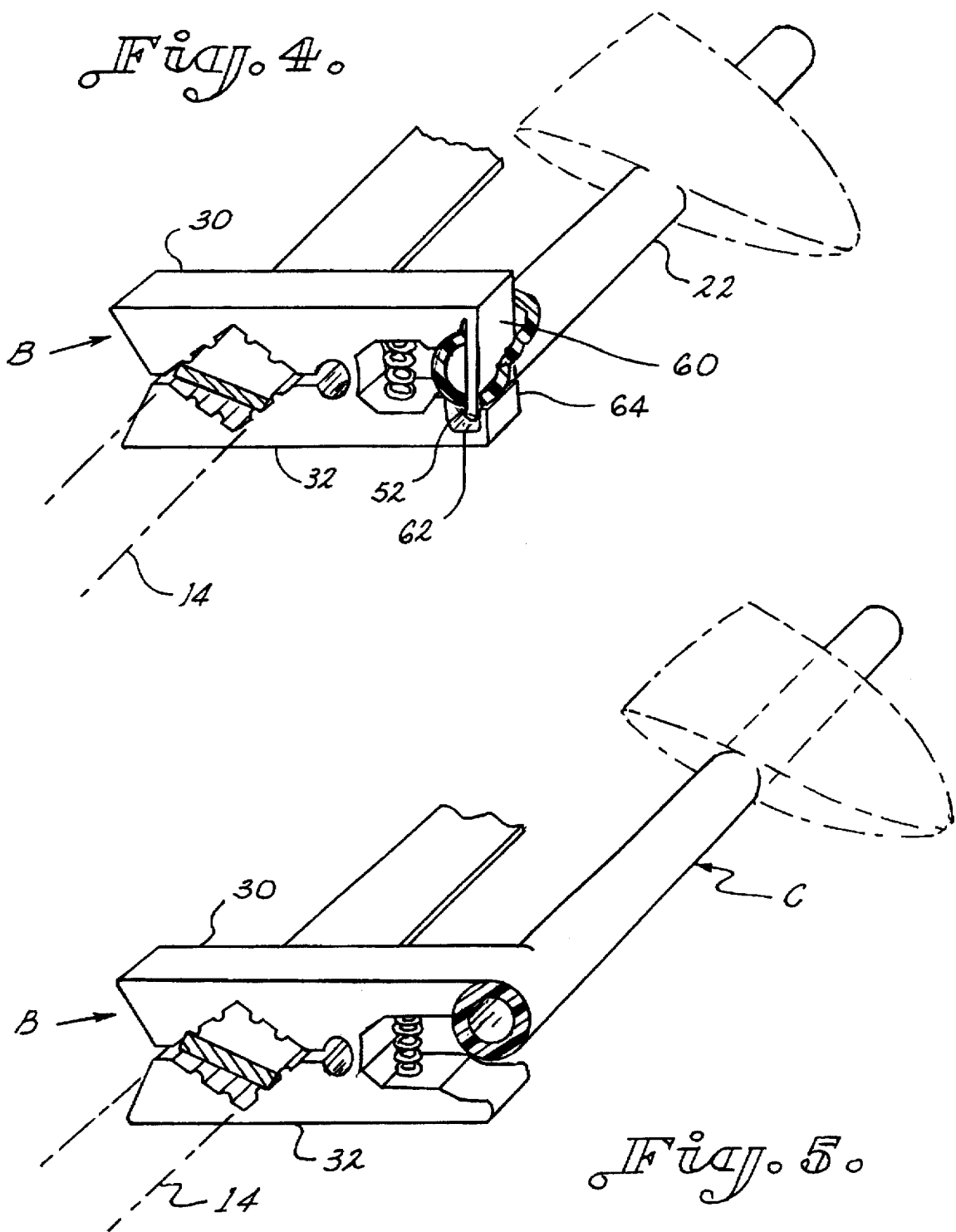

MECHANIZED ANIMATED DISPLAY FOR AN AUTOMOBILE

This is a continuation-in-part of application Ser. No. 08/115,763 filed on Sep. 3, 1993, now abandoned.

BACKGROUND OF THE INVENTION

The invention relates to a mechanical display for displaying a novelty item in conjunction with an automobile, and more particularly, to a mechanical display assembly for attachment to a wiper arm assembly of an automobile windshield for the displaying of a novelty article in combination with the oscillation of the automobile wiper arm assembly over the windshield. This provides the animated visual effect of the article as being manipulated by a human arm in a natural waving motion.

With the current success of certain sports teams and their respective fans, specifically the Atlanta Braves of Major League Baseball, and the Florida State Seminoles of the National Collegiate Athletics Association, it has become prominent to endeavor in a form of fan support known as the "Tomahawk Chop". A fan conducts the Tomahawk Chop by positioning his or her respective forearm approximately in a ninety degree (90°) angle away from the upper arm. The fan then pivots the forearm around the elbow such that the forearm extends a hundred and eighty degrees (180°) angle away from the forearm. This motion is repeated several times.

It is also popular to provide flags bearing the names and/or logos of sports teams and to provide removable mounts for mounting the flags to a travelling vehicle. However, no moving display, other than the flag blowing in the wind is provided. The attempts to display novelty items on vehicles has been rather limited to window mounts.

Numerous clamps have been proposed for clamping various articles to associated structures, for example, U.S. Pat. No. 3,231,951 discloses the use of a clamp with an automobile wiper arm for the temporary display of a parking ticket or coupon. U.S. Pat. No. 4,261,121 discloses the attachment of a disc to a clamp for the purpose of advertising. However, none of the devices are suitable for clamping a novelty item such as a tomahawk to an associated structure, particularly a moving associate structure as would impart animation to the item.

Accordingly, an object of the present invention is to provide a mechanical automobile display assembly for attachment to an associated part of an automobile to enable an article to be displayed in an animated manner.

Additionally, it is an object of the present invention to provide a mechanical automobile display assembly which will secure an article in such a manner that it will remain attached to an automobile wiper arm assembly when the article is being "chopped" or waved by the oscillating human-like wiper blade.

A further object of the present invention is to provide an economical display assembly for use with an automobile wiper arm assembly.

Additionally, it is an object of the present invention to provide a mechanical automobile display assembly which can safely be "chopped" or waved by the oscillating human-like wiper assembly without interfering with the standard automotive operations of the driver.

SUMMARY OF THE INVENTION

The above objectives are accomplished according to the present invention by providing a combination of an oscillating windshield wiper arm assembly, and unique mount for securing a novelty article for mechanical animated display. It has been found, according to the present invention, that an automobile wiper arm assembly simulates the same effect as the fan's arm when the novelty article is provided in the form of a tomahawk. The wiper arm and blade initiate from a general horizontal plane coplanar with the automobile hood and pivot to an angle approximately perpendicular with the hood. The pivoting of the wiper blade arm in relation to the hood fluctuates generally between a ninety degree (90°) and one hundred and eighty degree angle (180°) producing a chopping effect. The invention includes a mechanical automobile display assembly for attachment to an automobile wiper arm assembly whereby the oscillation of the automobile wiper arm assembly effectuates an animated visual effect of an article being carried by and manipulated by a human arm in a natural waving or chopping motion. The assembly includes a novelty article to be waved or chopped. A mounting bracket including a clamp secures the displayed article with the automobile wiper arm assembly. The mounting bracket remains secured to the wiper arm assembly during rapid oscillation of the wiper assembly. A retainer retains the displayed article on the mounting bracket to prevent the article from becoming detached from the display assembly when the assembly is being oscillated by the automobile wiper arm assembly. In some configurations, the article may be removed from the automobile for manual movement by a person at a sporting event and the like or for theft protection.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 4 is a cut away view illustrating a second configuration of an article attached to and retained by the mounting bracket according to the invention;

FIG. 5 is a perspective view of an article integral and unitary with the mounting bracket according to the invention.

DETAILED DESCRIPTION

Figure 1:
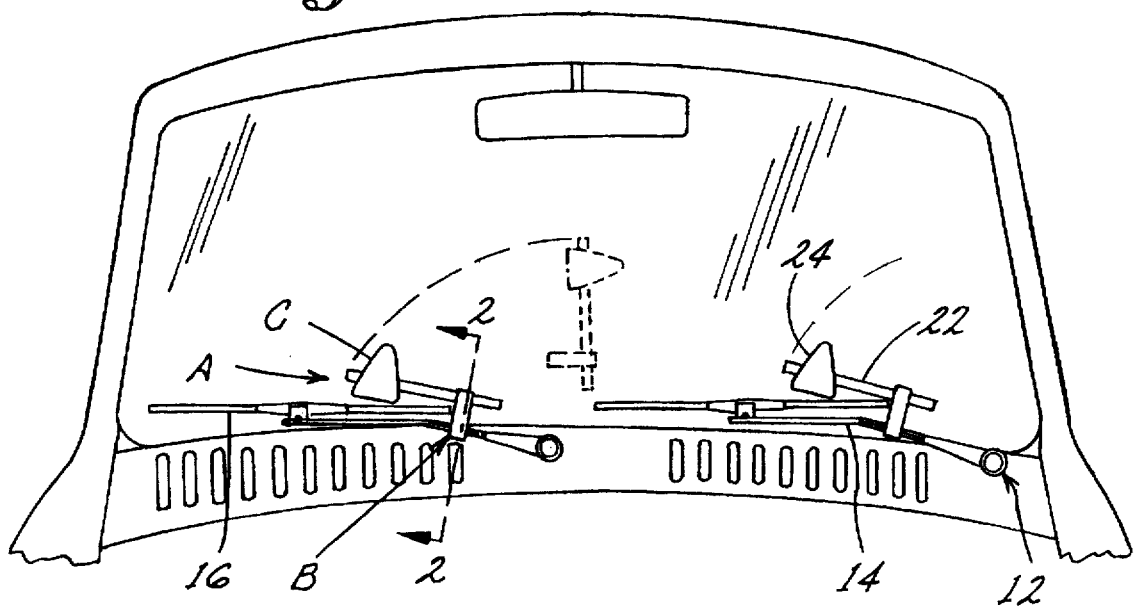
FIG. 1 is a perspective view of an article being "chopped" by an automobile wiper arm assembly according to the invention.
Figure 2:
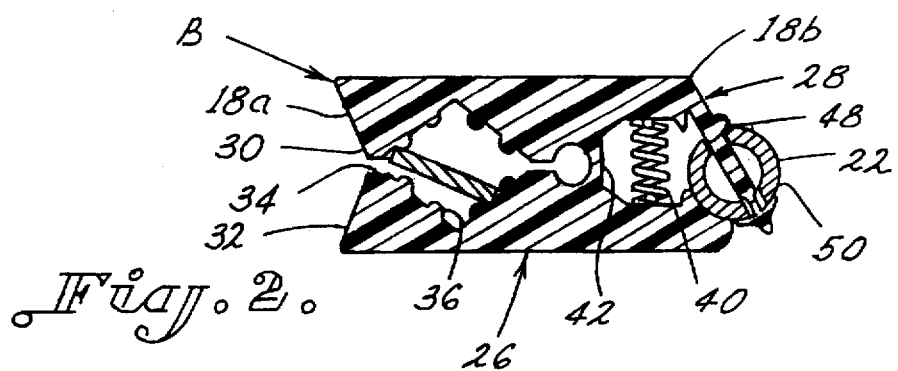
FIG. 2 is a perspective view of the mounting bracket according to the invention.

Referring now in more detail to the drawings, in FIGS. 1 and 2, a mechanical animated display assembly, designated generally as A, which oscillates over the automobile windshield is illustrated attached to an automobile wiper arm assembly 12. Automobile wiper arm assembly 12 includes a wiper arm 14 and a standard wiper blade assembly 16. Wiper blade assembly 16 includes a metal blade housing carrying a rubber blade. Display assembly A includes a mounting bracket, designated generally as B, and a novelty article C which is carried by mounting bracket B. Mounting bracket B and novelty article C are preferably made of light weight, thin plastic. In the illustrated embodiment, novelty article C is advantageously a tomahawk having a handle 22 and a head 24 whereby the handle is secured to the wiper arm assembly by the mounting described below. In this manner, the novelty article is displayed in an animated tomahawk chopping motion as the wiper arm assembly oscillates across the windshield carrying the novelty article.

As can best be seen in FIG. 2, mounting bracket B includes a clamp mechanism 26 on a first end 18a of mounting bracket B and an article holder mechanism 28 on a second end 18b of mounting bracket B. As shown in FIG. 5, novelty article C and article holder mechanism 28 may be made from a unitary construction. Clamp mechanism 26 enables mounting bracket B to be easily attached and removed from automobile wiper arm assembly 12. Clamp mechanism 26 includes a first jaw 30 and a second jaw 32 oppositely disposed. Jaws 30 and 32 are configured to form a diamond slot 34. Diamond slot 34 conforms to the shape of the standard commercially available wiper arm assembly and with this configuration enables mounting bracket B to be securely attached to automobile wiper arm assembly 12. Also, diamond slot 34 includes a raised surface having teeth-like indentures 36 which further aids mounting bracket B in being firmly secured with wiper arm assembly 12. This configuration prevents mounting bracket B from rotationally pivoting around wiper arm assembly 12 and thereby keeping novelty article C generally parallel to the windshield while oscillating across the windshield.

A resilient bias 40 urges jaws 30 and 32 together to tightly clamp mechanism mounting bracket B to automobile wiper arm assembly 12. Bias 40 enables mounting bracket B to remain firmly gripped to wiper arm assembly 12 when wiper arm assembly 12 is in oscillation. Hinge 42 connects first jaw 30 with second jaw 32. Hinge 42 is intermediary between bias 40 and the first end 18a of mounting bracket B where jaws 30 and 32 are located. When bias 40 is compressed, hinge 42 enables first jaw 30 to pivot away from second jaw 32 enabling diamond slot 34 to receive automobile wiper arm assembly 12. Bias 40 is preferably a spring which provides sufficient bias to secure mounting bracket B with automobile wiper arm assembly 12 during oscillation of the combination, which may be overcome to release mounting bracket B from wiper arm assembly 12.

Figure 3:
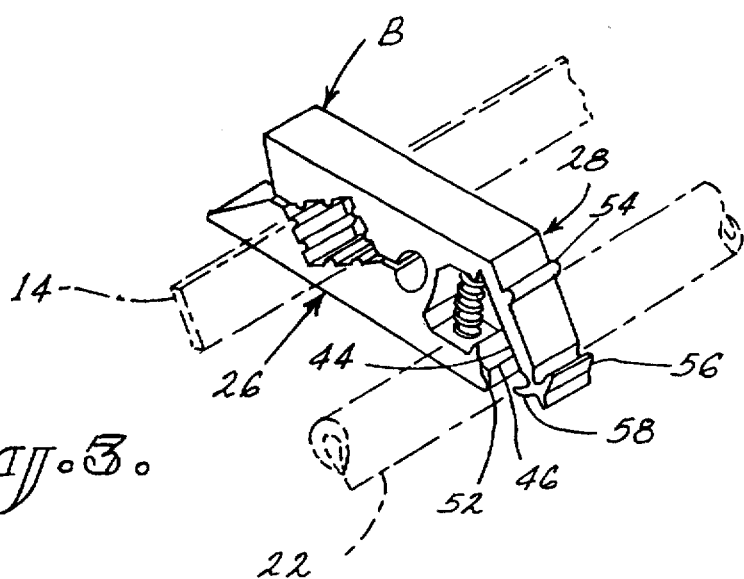
FIG. 3 is a perspective view illustrating a first configuration of an article attached to and retained by the mounting bracket according to the invention.

Article holder mechanism 28 carries novelty article C. Two separate configurations for displaying novelty article C are shown in FIGS. 3 and 4. Article attachment holder 28 includes an attachment arm 44 integral with at least one of jaws 30 or 32 for attaching article 12 to mounting bracket B. As one embodiment is shown in FIG. 3, attachment arm 44 is integral with first jaw 30 and in combination with second jaw 32 forms a mouth 46. As shown in FIG. 2, novelty article C includes a pair of apertures 48 and 50 for receiving attachment arm 46. Should novelty article C be comprised of a tomahawk, apertures 48 and 50 are located on handle 22. Attachment arm 44 is preferably resilient whereby attachment arm 44 may be extended to allow receipt of novelty article C within mouth 46, and thus enabling novelty article C to slide along attachment arm 44, while repositioning itself back to its original position. In this configuration second jaw 32 includes a sloped shoulder 52 for receiving handle 22 of novelty article C. The combination of resilient attachment arm 46 and shoulder 52 enables novelty article C to be firmly retained by mounting bracket B and prevents novelty article C from rotating whereby novelty article C remains generally parallel to the windshield.

Attachment arm 44 includes a stopping tab 54 which prevents novelty article C from advancing past a predetermined point. Article attachment holder 28 also includes a retainer 56 integral with attachment arm 46 for retaining novelty article C on attachment arm 46. In one configuration as best seen in FIG. 3, retainer 56 includes a pair of resilient braces 58 which extend perpendicularly outward from attachment arm 44 and deform to allow handle 22 to pass over braces 58 and slide down attachment arm 46. Once novelty article C passes over resilient braces 58, resilient braces 58 return to their original upright position preventing article 12 from detaching from attachment arm 46.

A second configuration for retaining novelty article C with mounting bracket B can be seen in FIG. 4. Attachment arm 60 is integral with first jaw 30 and when extended away from second jaw 32 forms in combination with second jaw 32 a mouth 62. Novelty article C includes a pair of apertures 50 and 52 for receiving attachment arm 60. Attachment arm 60 is preferably resilient whereby attachment arm 60 may be extended to allow receipt of novelty article C within mouth 62, and thus enabling novelty article C to slide along attachment arm 60. A resilient shoulder 64 depends from second jaw 32 and extends beyond the end of attachment arm 60 when attachment arm 60 is in a downward position. In operation, attachment arm 60 extends away from second jaw 32 forming mouth 62 and novelty article C is impaled upon attachment arm 60. The attachment arm 60 carrying novelty article C is passed over resilient shoulder 64, which deforms to enable attachment arm 60 to pass over, closing mouth 62. Thereby novelty article C is securely retained by mounting bracket B and prevents novelty article C from rotating whereby novelty article C remains generally parallel to the windshield.

For operation, novelty article C is attached to wiper arm assembly 12 in a manner that the vision of the driver of the automobile is not impaired. Common sense applies to the attachment of novelty article C to the wiper arm assembly so that neither the driver nor public is endangered. It is desired that novelty article C be attached when the vehicle is being slowly driven such as on the way to the stadium or when parked in a parking lot during tailgating and the like.

Thus it can be seen that a more advantageous mechanical automobile display assembly for attachment to an automobile wiper arm assembly may be had according to the invention such that the overall visual effect of a mechanical "Tomahawk" chop may be created. Through a mounting bracket having jaws and an attachment arm, a novelty article may be secured to an automobile wiper arm assembly such that the oscillation of the automobile wiper arm assembly effectuates an animated visual effect of the article being waved or chopped by a human arm. Through the incorporation of jaws forming a diamond slot having a raised surface area, said mounting bracket is secured with said automobile wiper arm assembly such that the torque generated by said article oscillating with said wiper arm assembly is resisted by said mounting bracket maintaining the mounting bracket's connection with said wiper arm assembly, and maintaining the novelty article generally parallel to the automobile windshield.

While a preferred embodiment of the invention has been described using specific terms, such description is for illustrative purposes only, and it is to be understood that changes and variations may be made without departing from the spirit or scope of the following claims.

What is claimed is:

1. A mechanical animated display which includes an automobile wiper arm assembly capable of repeated oscillation across an automobile windshield, said display comprising:

a novelty article having a body portion and a handle portion having a slot;

a mounting bracket;

a clamp mechanism having a pair of jaws carried by said mounting bracket removably securing said mounting bracket to said wiper arm assembly;

an article holder carried by said mounting bracket, said article holder being constructed to pass through said slot of said handle to secure said novelty article with said mounting bracket in a manner to prevent detachment and restrict rotational movement of said novelty article during repeated oscillations of said wiper arm assembly whereby;

said mounting bracket and novelty article in combination with said wiper arm assembly producing an animated visual effect of said novelty article to appear as being carried and manipulated by a human arm in a natural waving motion.

2. The display of claim 1 wherein said clamp mechanism jaws form a diamond-shaped slot for receiving said wiper assembly.

3. The display of claim 1 wherein said article holder includes an attachment arm of a given length for passing through said slot, attaching said article to said mounting bracket and a retainer carried by said attachment arm for fixedly retaining said article attached with said mounting bracket.

4. The display of claim 3 wherein said attachment arm includes a resilient brace which deforms to allow said attachment arm to pass through said slot and returns to its original position to secure said article with said attachment arm.

5. A mechanical animated automobile display assembly in combination with an automobile wiper arm assembly which oscillates across an automobile windshield comprising:

a tomahawk including a handle and a head;

a mounting bracket attached to said wiper arm assembly;

a clamp mechanism carried by said mounting bracket securing said mounting bracket to said wiper arm assembly, said clamp mechanism including a plurality of jaws;

an article holder mechanism carried by said mounting bracket receiving said tomahawk handle, said holder mechanism being constructed and arranged to firmly secure said tomahawk during oscillation of said wiper arm assembly against detachment and rotational movement;

an attachment carried by said article holder mechanism for securely locking said tomahawk handle to said mounting bracket;

a retainer for positively securing said tomahawk on said attachment when said display assembly is repeatedly oscillated by said wiper arm assembly; whereby said tomahawk and mounting bracket during oscillation of said automobile wiper arm assembly produce an animated visual effect of a moving tomahawk.

6. The display of claim 5 wherein said retainer includes an attachment arm carrying a resilient brace which deforms to allow said brace and attachment arm to pass through said tomahawk handle, said brace returning to its original position secures said tomahawk on said attachment arm preventing detachment or rotation of said tomahawk handle.

* * * * *